United States Patent
Miller et al.

(10) Patent No.: US 8,038,372 B2
(45) Date of Patent: Oct. 18, 2011

(54) PUSH BUTTON HOLESAW MANDREL ASSEMBLY

(75) Inventors: Mark D. Miller, Airville, PA (US);
Mark E. Brunson, Bel Air, MD (US);
Rickey J. Thomas, Lineboro, MD (US);
Joseph Kelleher, Bowie, MD (US);
Aland Santamarina, Columbia, MD (US)

(73) Assignee: Black & Decker Inc., Newark, DE (US)

( * ) Notice: Subject to any disclaimer, the term of this patent is extended or adjusted under 35 U.S.C. 154(b) by 855 days.

(21) Appl. No.: 12/062,787

(22) Filed: Apr. 4, 2008

(65) Prior Publication Data

US 2008/0253852 A1 Oct. 16, 2008

Related U.S. Application Data

(63) Continuation-in-part of application No. 11/787,267, filed on Apr. 13, 2007.

(51) Int. Cl.
*B23B 51/04* (2006.01)
(52) U.S. Cl. ...................... 408/204; 408/239 R; 403/348
(58) Field of Classification Search .......... 408/204–209, 408/139, 140, 239 R; 279/7, 8, 141; 192/93 C, 192/54.52; 403/348, 349; *B23B 51/04*
See application file for complete search history.

(56) References Cited

U.S. PATENT DOCUMENTS

| | | | |
|---|---|---|---|
| 2,435,648 A | 2/1948 | Frevel | |
| 2,778,091 A * | 1/1957 | St Palley | 408/231 |
| 2,779,361 A * | 1/1957 | McKiff | 408/204 |
| 2,917,975 A * | 12/1959 | Webster | 407/48 |
| 3,220,449 A | 11/1965 | Franklin | |
| 3,267,975 A | 8/1966 | Enders | |
| 3,293,740 A | 12/1966 | Enders | |
| 3,360,025 A | 12/1967 | Gallo, Sr. | |
| 3,758,221 A | 9/1973 | Meshulam | |
| 3,784,316 A | 1/1974 | Bittern | |
| 3,825,362 A * | 7/1974 | Hougen | 408/68 |
| 3,837,759 A | 9/1974 | Bittern | |
| 3,880,546 A | 4/1975 | Segal | |
| 3,970,407 A | 7/1976 | Uffman | |
| 3,973,862 A * | 8/1976 | Segal | 408/204 |
| 4,036,560 A | 7/1977 | Clark et al. | |
| 4,072,441 A | 2/1978 | LaPointe | |
| 4,077,737 A | 3/1978 | Morse | |
| 4,303,357 A | 12/1981 | Makar | |

(Continued)

FOREIGN PATENT DOCUMENTS

EP 0 958 083 9/2001

(Continued)

*Primary Examiner* — Eric A Gates
(74) *Attorney, Agent, or Firm* — Harness, Dickey & Pierce, P.L.C.

(57) ABSTRACT

A holesaw mandrel assembly has a mandrel body with a first end to be coupled with a drill motor and a second end extending from the body. The second end receives a holesaw. A housing covers a portion of the mandrel. A first member is coupled with the housing and moves between a first and second position. A friction surface is on the first member. The friction surface is adapted to contact the holesaw such that upon contact with the friction surface, the holesaw is fixed in position. The friction surface moves between a first contact position and a second release position. A mechanism coupled with the housing moves the friction face between the first and second positions.

11 Claims, 7 Drawing Sheets

U.S. PATENT DOCUMENTS

| | | | |
|---|---|---|---|
| 4,422,811 A | 12/1983 | Ellison et al. | |
| 4,490,080 A | 12/1984 | Kezran | |
| 4,588,335 A | 5/1986 | Pearson, Jr. | |
| 4,669,928 A | 6/1987 | Mediavilla | |
| 4,741,651 A | 5/1988 | Despres | |
| 4,755,087 A | 7/1988 | Parent | |
| 4,929,128 A * | 5/1990 | Affleck | 408/139 |
| 4,968,189 A | 11/1990 | Pidgeon | |
| 5,035,548 A | 7/1991 | Pidgeon | |
| 5,061,126 A | 10/1991 | Cain et al. | |
| 5,076,741 A | 12/1991 | Littlehorn | |
| 5,096,341 A * | 3/1992 | Despres | 408/68 |
| 5,108,235 A | 4/1992 | Czyzewski | |
| 5,154,552 A | 10/1992 | Koetsch | |
| 5,171,111 A | 12/1992 | Kishimoto | |
| 5,175,963 A * | 1/1993 | Schafer et al. | 451/342 |
| 5,226,762 A | 7/1993 | Ecker | |
| 5,246,317 A | 9/1993 | Koetsch et al. | |
| 5,352,071 A | 10/1994 | Cochran et al. | |
| 5,429,457 A * | 7/1995 | Asano et al. | 408/204 |
| 5,435,672 A * | 7/1995 | Hall et al. | 408/68 |
| 5,597,274 A | 1/1997 | Behner | |
| 5,624,213 A * | 4/1997 | Anderson | 408/206 |
| 5,639,193 A * | 6/1997 | Anderson | 408/204 |
| 5,658,102 A | 8/1997 | Gale | |
| 5,690,452 A | 11/1997 | Baublits | |
| 5,868,532 A | 2/1999 | Spenser | |
| 5,957,636 A | 9/1999 | Boisvert | |
| 5,967,709 A | 10/1999 | Thuesen | |
| 6,120,221 A | 9/2000 | Alm | |
| 6,341,925 B1 | 1/2002 | Despres | |
| 6,357,973 B2 | 3/2002 | Chao | |
| 6,379,089 B1 | 4/2002 | Sugiura et al. | |
| 6,409,436 B1 | 6/2002 | Despres | |
| 6,554,292 B1 | 4/2003 | Rohm | |
| 6,604,744 B2 | 8/2003 | Monge | |
| 6,623,220 B2 | 9/2003 | Nuss et al. | |
| 6,641,338 B2 | 11/2003 | Despres | |
| 6,705,807 B1 | 3/2004 | Rudolph et al. | |
| 6,851,678 B2 | 2/2005 | Mack | |
| 6,887,018 B2 * | 5/2005 | Ostermeier | 408/204 |
| 7,001,116 B2 * | 2/2006 | Kozak | 408/68 |
| 7,073,992 B2 | 7/2006 | Korb et al. | |
| 7,097,397 B2 | 8/2006 | Keightley | |
| 7,101,124 B2 | 9/2006 | Keightly | |
| 7,104,738 B2 | 9/2006 | Cantlon | |
| 7,112,016 B2 | 9/2006 | Nordlin | |
| 7,163,362 B2 | 1/2007 | Keightly | |
| 7,488,146 B2 * | 2/2009 | Brunson | 408/204 |
| 7,517,179 B2 * | 4/2009 | Miller et al. | 408/204 |
| 2002/0122703 A1 | 9/2002 | Czyzewski et al. | |
| 2005/0025591 A1 * | 2/2005 | Korb et al. | 408/204 |
| 2006/0088393 A1 | 4/2006 | Cooper | |
| 2010/0239381 A1 * | 9/2010 | Kelleher | 408/204 |

FOREIGN PATENT DOCUMENTS

| | | |
|---|---|---|
| EP | 0 951 375 | 4/2002 |
| EP | 1 193 014 | 7/2004 |
| EP | 1 462 198 | 9/2004 |
| EP | 1 555 076 | 7/2005 |
| GB | 2 257 381 | 1/1993 |
| WO | WO 97/15413 | 5/1997 |
| WO | WO 2004/011179 | 2/2004 |
| WO | WO 2004/085104 | 10/2004 |
| WO | WO 2005/000506 | 1/2005 |
| WO | WO 2005/120754 | 12/2005 |
| WO | WO 2006/122417 | 11/2006 |

* cited by examiner

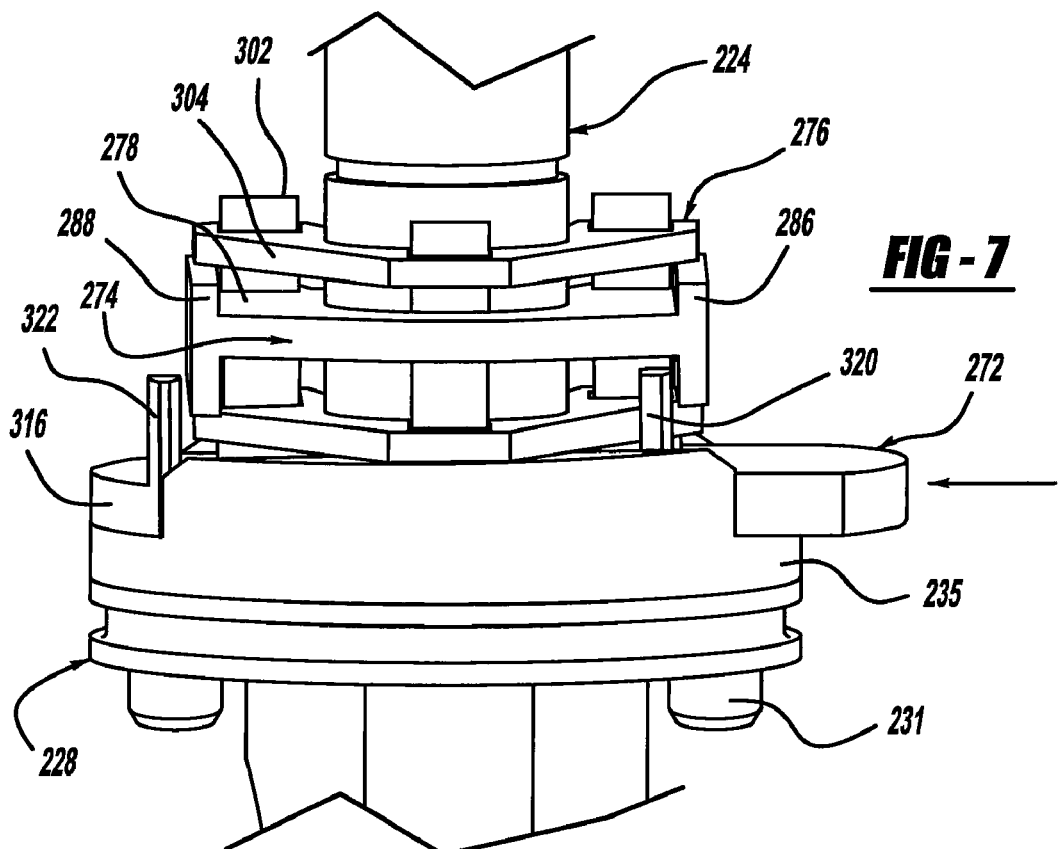
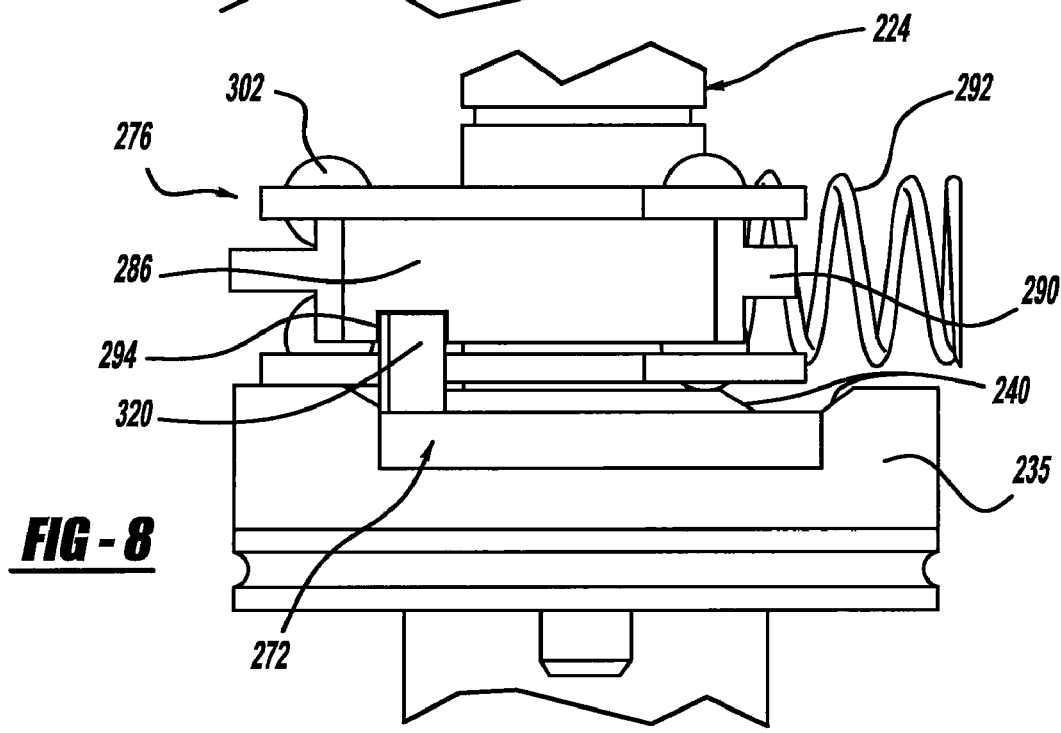

PUSH BUTTON HOLESAW MANDREL ASSEMBLY

CROSS REFERENCE TO RELATED APPLICATION

This is a continuation-in-part of application Ser. No. 11/787,267, filed Apr. 13, 2007. The disclosure of the above application is incorporated herein by reference.

FIELD

The present disclosure relates to holesaws and, more particularly, to a mandrel assembly which receives holesaws.

BACKGROUND

Various types of holesaw mandrel assemblies exist in the art. The assemblies are concerned with a quick release device in order to readily remove the holesaw from the mandrel assembly after use. Various types of mechanisms have been utilized in order to secure the holesaw onto the mandrel assembly, all of which enable the holesaw to be removed. Some of these mandrel assemblies utilize pins or the like which fit into the base of the holesaw. The pins hold the holesaw in position during rotation and cutting. However, since the holesaw is not torque down onto the collar adjacent the threaded spud, the pins can be removed from the base of the holesaw and the holesaw can be easily rotated and removed from the threaded spud.

When smaller diameter holesaws are utilized, the base of the holesaw does not include holes to receive the pins on the mandrel assemblies. This is due to the fact that the diameter of the base is too small to register with the pins. Also, during use, due to the threaded engagement of the spud with the small holesaw, the holesaw is torqued down onto the collar of the mandrel assembly. Accordingly, a wrench or the like is required to loosen the holesaw from the mandrel collar in order to remove the holesaw from the mandrel assembly. The art does not provide a small holesaw mandrel which enables the user to quickly remove, by hand, the holesaw from the mandrel assembly. Thus, it is desirable to have a mandrel assembly which enables the quick release of small diameter holesaws.

SUMMARY

The present disclosure provides the art with a holesaw mandrel assembly which enables a quick release of holesaws from the mandrel assembly. The present holesaw mandrel assembly provides a friction face that abuts the holesaw. The friction face axially moves away from the holesaw into a release position. The holesaw assembly enables the friction face to move automatically back to its original position. The holesaw mandrel assembly provides a push button action to enable the axial movement of the friction face.

According to a first aspect of the disclosure, a holesaw mandrel assembly comprises a mandrel having a body with a first end to couple with a drill motor. A second end extends from the body. The second end includes a thread to receive a holesaw. A first member is positioned on the second end. The first member axially moves on the second end. A friction surface is on the first member. The friction surface is adapted to contact or engage a base surface of the holesaw such that upon contact with the friction surface, the holesaw is fixed in position. The friction surface moves between a first contact and second release position. A mechanism, on the first member, moves the friction surface between the first and second positions. The mechanism is biased to return the first member to its first position from its second or released position. The mechanism includes a second member movable transverse to the mandrel axis to enable the axial movement of the first member. At least one roller is positioned between the first and second member. The second member includes a body including at least one recess to receive the at least one roller. The mechanism includes at least one cage to retain the at least one roller.

According to a second aspect of the disclosure, a holesaw mandrel assembly comprises a mandrel which includes a body with a first end to couple with a drill motor. A second end extends from the body. The second end includes a thread to receive a holesaw. A first member is on the second end. The first member axially moves on the second end. A push button mechanism is coupled with the first member. At least one roller is associated with the push button mechanism. The at least one roller is in contact with the push button member. The push button member moves between a first and a second position to enable the first member to move axially along the second end. When the push button mechanism is in its first position, the first member is fixed so that a holesaw may be screwed onto the thread and abuts the first member to secure a holesaw in a use position on the first member. When the push button mechanism is moved to its second position, the first member moves axially away from the holesaw to enable the holesaw to be easily removed from the thread. The push button mechanism includes at least one recess which is adjacent to the at least one roller. When the push button mechanism is in its second position, the at least one roller is positioned in the at least one recess. A plurality of rollers is present with at least two rollers sandwiching the push button mechanism. A pair of friction plates are positioned such that the at least two roller each contact one of the pair of friction plates. A biasing member moves the push button mechanism between the first and second positions.

According to a third aspect of the disclosure, a holesaw mandrel assembly comprises a mandrel with a body which includes a first end to couple with a drill motor. A second end extends from the body. The second end includes a thread to receive a holesaw. A first member is on the second end. The first member axially moves on the second end. A friction surface is on the first member. The friction surface is adapted to contact the base surface of the holesaw such that upon contact with the friction surface, the holesaw is fixed in position. The friction surface moves between a first contact and a second release position. A mechanism is coupled with the first member to move the friction surface between the first and second positions. The mechanism comprises a push button member extending through the first member. The push button member includes a body member with two side faces with a plurality of recesses on each side face. A plurality of rollers, equal in number to the plurality of recesses, is positioned on the two sides of the body member. The plurality of rollers is positioned adjacent to the plurality of recesses. When the plurality of rollers is on the side faces, the first member is in its first position. When the rollers are in the recesses, the first member is in the second position. The push button member moves between the first and second positions, via a spring, wherein the plurality of rollers move in and out of the adjacent recesses. A pair or cages retain the roller in position. A pair of friction members are positioned adjacent the rollers. One friction member is on each side of the push button member and in contact with the rollers.

According to a fourth aspect of the disclosure, the holesaw mandrel assembly comprises a mandrel having a body and a first and second end. The first end couples with the drill motor. The second end extends from the body and includes a mechanism to receive a holesaw. A housing covers a portion of the mandrel. The housing is coupled with the mandrel. A first member is coupled with the housing. The first member is movable along the second end of the mandrel. A friction surface of the first member is adapted to contact a surface of a holesaw such that upon contact, the friction surface fixes the holesaw in position with respect to the mandrel assembly. The friction surface moves between a first and a second position. A mechanism is associated with the housing to move the friction surface between the first and second positions. The mechanism further includes a slider assembly associated with the first member and release member coupled with the slider assembly. The release member moves between a first and second position to lock and unlock the slider assembly in the housing. A biasing member biases the slider assembly between the locked and unlocked position. The slider assembly further includes a plate having a first and second side. An aperture is formed in the plate to receive the second end of the mandrel. The aperture is sized to enable movement of the plate laterally with respect to the axis of the mandrel. A pair of roller assemblies is arranged on the plate first and second sides. One of the roller assemblies is sandwiched between the first member and the plate. The other roller assembly is sandwiched between the plate and the mandrel body. A pair of grooves is formed in a body member to receive the rollers of the roller assembly such that as the rollers fall into the grooves, the friction surface moves between its first and second position. A pair of rails is positioned at two opposing edges of the plate. At least one rail includes a cutout portion. A ramp is on the release member. The ramp moves in and out of the cutout to lock and unlock the slider assembly. Bosses are formed on the housing to contact the rail to enable smooth transitional movement of the slider assembly in the housing. At least one bore is formed in the body member to receive a spring. The spring biases the release member between its first and second position. The roller assembly includes a plurality of rollers secured by a cage. At least one roller is positioned on different sides of a plane through the axis of the mandrel assembly.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 7 is a view like FIG. 6 of the mandrel assembly in a second position.

FIG. 8 is a side elevation view, rotated ninety degrees with respect to FIG. 6, of the mandrel assembly, with the housing removed, in a first position.

DETAILED DESCRIPTION

Figure 1:
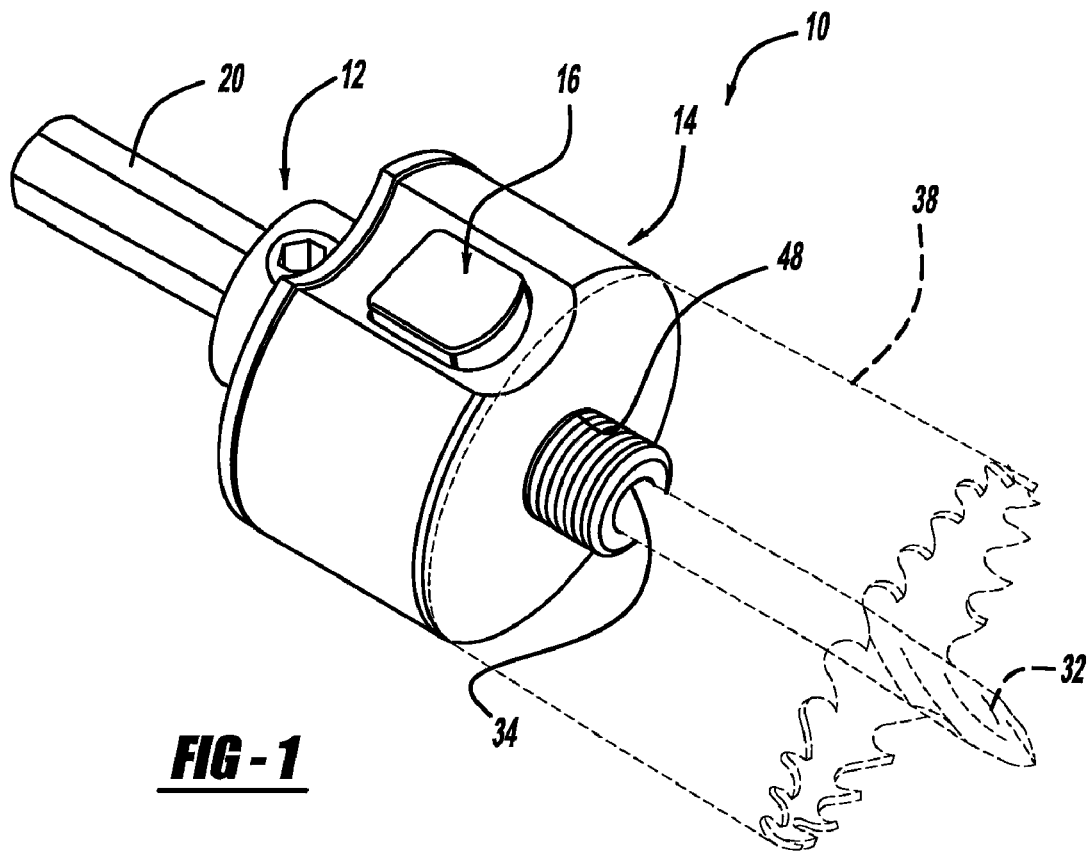
FIG. 1 is a perspective view of a holesaw mandrel.

The following description is merely exemplary in nature and is not intended to limit the present disclosure, application, or uses.

Turning to the figures, a holesaw mandrel is illustrated and designated with the reference numeral 10. The mandrel assembly 10 includes a mandrel 12, a first movable member 14, and a mechanism 16 for moving the first member 14 between a first and second position. The mandrel 12 includes a body 18 with a first projecting end 20 and a second extending end 22. The first projecting end 20 is cylindrical and may have an outer polygonal surface to connect the mandrel 12 with a rotating tool, such as a drill. The body 18 has a first cylindrical portion 24 and a larger plate portion 26. The first portion 24 includes an aperture 28 to receive a fastener 30 which retains a pilot drill bit 32 in a bore 34. The pilot drill bit 32 extends through the second extending member 22. The second plate 26 has an overall elongated D-shape and includes a flat receiving surface 36.

The second extending end 22 of the mandrel 12 includes a first cylindrical portion 40 and a threaded spud 42. The threaded spud 42 receives a holesaw 38 in a conventional manner. The first cylindrical portion 40 extends from the larger second plate portion 26.

Figure 2:
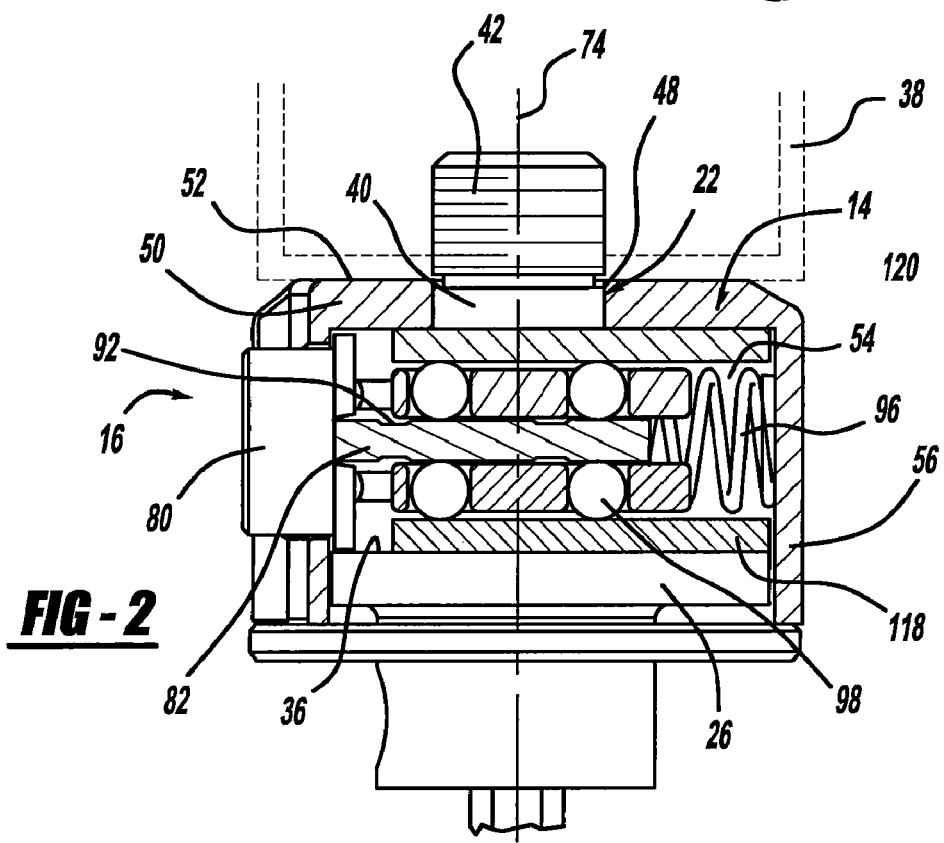
FIG. 2 is a cross section view of the mandrel of FIG. 1 in a first position.

The first member 14 has an overall cup shaped configuration. The first member includes a bore 48 through the base portion 50 of the cup shaped first member 14. The base portion 50 includes a friction face 52 which receives the base of the holesaw 38 as seen in FIG. 2. The bore 48 enables the first member 14 to be positioned on the second end 22 of the mandrel 12. The bore 48 opens into a larger cylindrical open space 54 inside the cylindrical wall 56 of the cup shaped first member 14. The wall 56 includes an arcuate cut-out portion 58 as well as a bore 60 which receives a portion of the moving mechanism 16. A back plate 62 is connected with the wall 56. The back plate 62 is substantially parallel to the base portion 50. The back plate 62 includes a pair of apertures 64 which receive fasteners 68 to retain a securement plate 70 onto the first member 14. The securement plate 70 includes an aperture 71 to receive the mandrel cylindrical portion 24 as well as a pair of apertures 73 to receive fasteners 68. The back plate 62 includes a cut-out 72, having an overall elongated D-shape, to receive the moving mechanism 16 and the mandrel plate portion 26.

The mechanism 16, which moves the first member 14 between a first and second position, is positioned transverse to the longitudinal axis 74 of the mandrel 12. The mechanism 16 includes a push button 80 which is positioned in the aperture 60. The push button 80, through its movement which will be explained later, enables the axial movement of the first member 14 on the mandrel 12. The push button 80 is coupled with or unitarily formed with a plate member 82. The plate member 82 includes a projection 84 which seats inside of the push button 80. The plate member 82 has an overall rectangular annular shape with an elongated elliptical opening 86 in the middle of the plate member 82. The elliptical opening 86 receives the mandrel second end 22. The plate member 82 includes a pair of side faces 88 and 90. The side faces 88 and 90 each include at least one and preferably a plurality of recesses 92. Also, the plate member 82 includes a tail 94 and recess 95 which are associated with the biasing spring 96. The spring 96 biases the push button 80 between its first and second positions.

Figure 3:
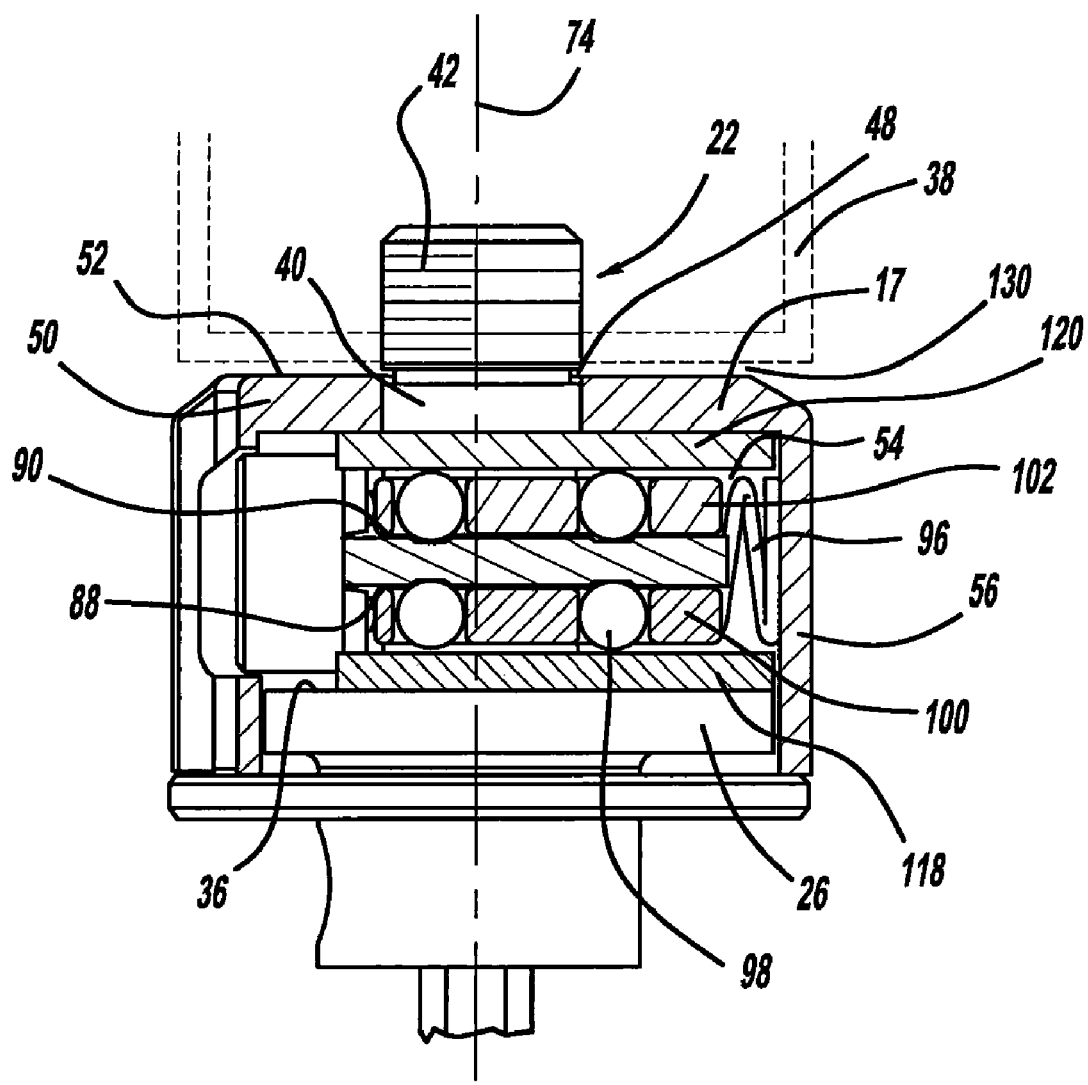
FIG. 3 is a view like FIG. 2 in a second position.
Figure 4:
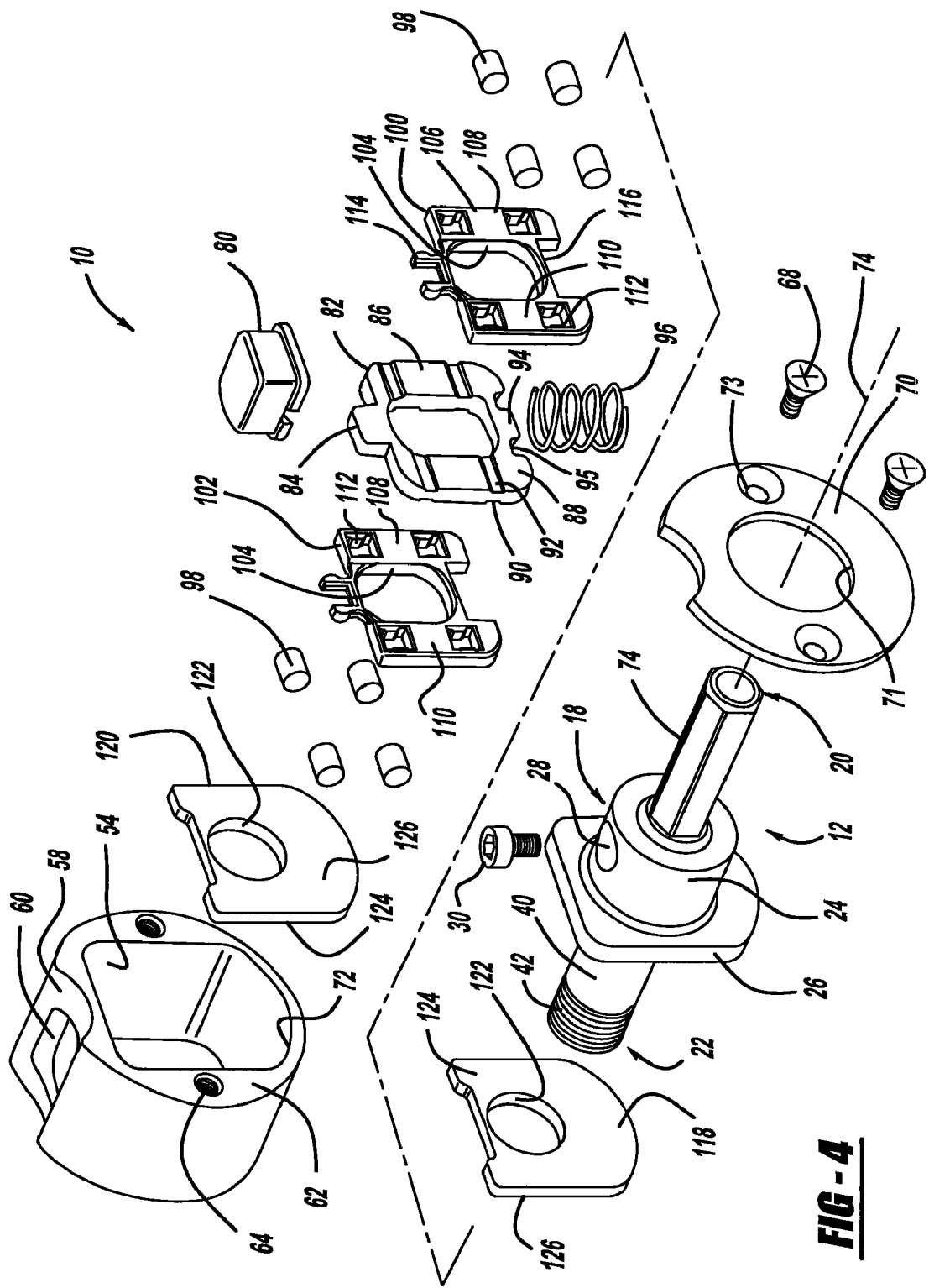
FIG. 4 is an exploded perspective view of the mandrel of FIG. 1.
Figure 5:
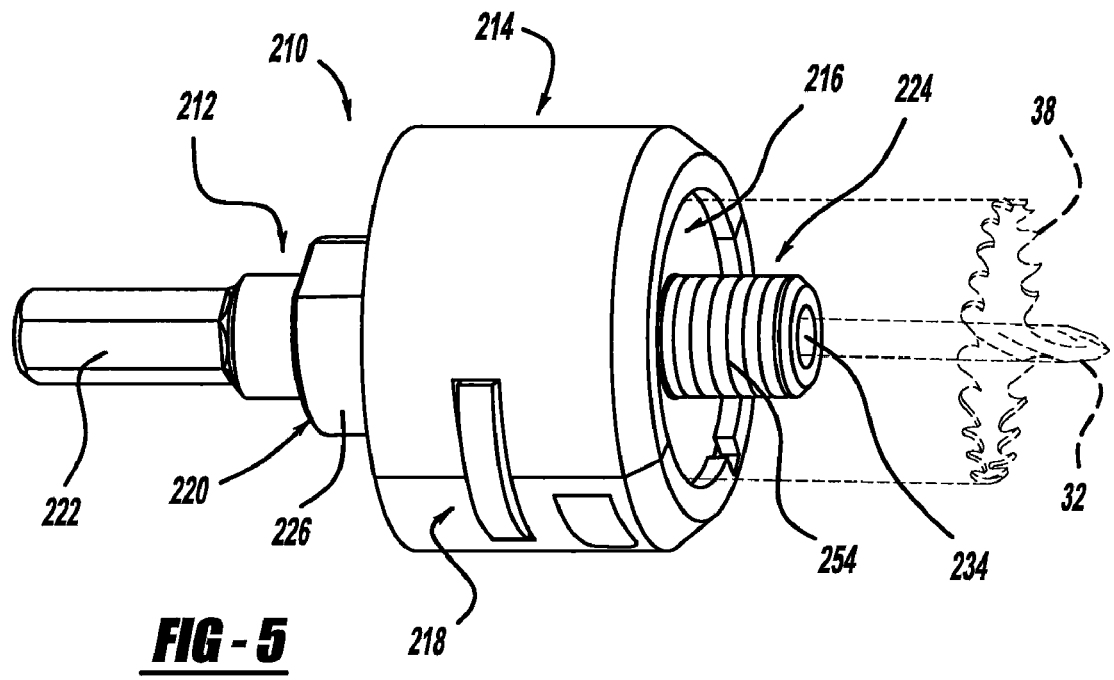
FIG. 5 is a perspective view of the mandrel assembly according to a second embodiment.

At least one and preferably a plurality of rollers 98 are positioned on each side face 88 and 90 of the plate member 82. The rollers 98, when the push button 80 is in a first position as seen in FIG. 2, rest on the planar side faces 88, 90 of the plate member 82. In the push button 80 second position as seen in FIG. 3, the rollers move from the planar side faces 88, 90 into the recesses 92.

A pair of cages 100 and 102 holds the rollers 98 in position. The cages 100 and 102 are identical and the disclosure of one equally applies to the other. The cages 100, 102 have an overall rectangular shape with an elliptical aperture 104, to receive the mandrel second end 22, in the middle of the body 106. The body 106 has two sides 108 and 110, each of which includes at least one, and shown with a pair of apertures 112. The apertures 112 receive the rollers 98 in the cages 100 and 102. A projecting member 114 extends from the body 106 into the push button member 80. Also, a cutout 116 is opposite the projecting member 114 to enable the biasing spring 96 to seat in the cutout portion 116.

A pair of friction plates 118 and 120 sandwiches the rollers and cages against the plate 82. The friction plates 118 and 120 are substantially identical and the explanation with respect to one applies to both. The friction plates 118 have an overall D shape with a circular aperture 122. The aperture 122 is circular and sized to fit onto the second extending member 22 of the mandrel 12. Thus, unlike the plate 82 and cages 100, 102, the friction plates 118, 120 are unable to move laterally with respect to the extending member 22. The friction plates 118 and 120 have flat planar surfaces 124 and 126. The flat planar surfaces 124, 126 provide a rolling surface for the rollers 98. One of the flat planar surfaces of the plate 118 abuts the flat surface 36 of the second plate member 26 of the mandrel 12 while the other abuts the flat inside surface of base 50. It should be noted that the friction plates may be removed and the flat surface 36 and inside surface of the base 50 may be used as the rolling surfaces for the rollers 98.

The friction plates 118 and 120 as well as cages 100 and 102 with rollers 98 sandwiching plate 82 are all positioned onto the extending member 22 of the mandrel 12. This is best illustrated in FIGS. 2 and 3. The biasing spring 96 abuts one side of the wall 56 opposite to the aperture 60. The push button 80 projects from the aperture 60 in the arcuate cutout portion 58. The plate 70 and the screw 68 retain the mandrel 12 in an assembled position with the first member 14 and the moving mechanism 16, positioned inside of the first member 14, on the mandrel 12.

A holesaw 38 is screwed onto spud 42 until it abuts the friction surface 52 of the first member 14 (see FIG. 2). At this time, the holesaw 38 is in a use position abutting the friction surface 52 which receives the force from the holesaw 38 torque during operation. Once the holesaw 38 is used to drill a hole and a different holesaw is desired, the holesaw 38 is removed from the mandrel. In order to do this, push button 80 is moved inward tranversed to the longitudinal axis 74 of the mandrel 12. As this occurs, plate 82 is moved laterally against the spring 96. As the plate 82 continues to move, the cages 100 and 102 move laterally half the distance of the plate 82. As the button 80 is fully depressed (see FIG. 3), the rollers 98 fall into the recesses 92 in the plate 82. As this happens, due to the force on the friction surface 52 of the first member 14 as well as the space created by the recesses 92, the first member 14 moves away from a holesaw 38 as seen in FIG. 3. A gap 130 is created between the holesaw 38 and the friction surface 52 of the first member 14. This enables the user to easily remove the holesaw 38 from the threaded spud 42. Once the force is removed from the push button 80, the spring 96 returns the push button 80, as well as the plate 82 and cages 100, 102, to their original position. Since the spring 96 is able to move the plate 82 as well as the cages 100, 102, it enables the cages 100, 102 and plate 82 to align and register with one another so that the rollers 98 are in a proper first position with respect to the recesses 92 as shown in FIG. 2. Thus, the mandrel assembly 10 is ready for its next use.

Turning to FIGS. 5-10, an additional embodiment of the present invention is illustrated.

A holesaw assembly is illustrated and designated with the reference numeral 210. The mandrel assembly 210 includes a mandrel 212, a housing 214 with a first member 216 and a mechanism 218 to move the first member 216 between a first and second position.

The mandrel 212 includes a body 220 with a first projecting end 222 and a second extending end 224. The first projecting end 222 is cylindrical and may have outer polygonal surfaces to connect the mandrel with the rotating tool, such as a drill motor.

The body 220 has a first cylindrical portion 226 and a larger cylindrical plate portion 228. The first cylindrical portion 224 includes an aperture 230 to receive a fastener 232 that retains the pilot drill bit 32 in a bore 234. The pilot drill bit 32 extends through the second extending member 222. The second cylindrical plate 228 includes a flat receiving surface 236. Additionally, the circumferential surface of the plate 228 includes a groove 242 to receive an O-ring 244. Pins 231 are secured in bores 233 in the cylindrical plate 228 to position the housing 214 on the mandrel body 220.

The second end 224 of the mandrel assembly includes a cylindrical portion 252 and a threaded spud 254. The threaded spud 254 receives a holesaw 38 in a conventional manner. The cylindrical portion 252 extends from the second larger cylindrical plate portion 228.

The housing 214 has an overall cylindrical shape formed by two clam shell sides, that is opened at both ends to receive the mandrel body 220. One end of the housing 214 has an interior groove 256 that receives the first member 216, which is disk shaped. The groove 256 has a thickness larger than the thickness of the first member 216 to enable axial movement of the first member 216 in the groove 256 of the housing 214. The housing 214 includes bosses 258. Additionally, the housing 214 includes an aperture 260 to receive the mechanism 218 that moves the first member 216 between its first and second position. The housing 214 is secured to the mandrel body 220 and is fixed for movement with respect to the same.

The first member 216, with its overall disk shape, includes a friction surface 262. The friction surface 262 receives and abuts the holesaw 38, as illustrated in phantom in FIG. 5. Accordingly, the holesaw 38 is screwed onto the spud 254 until it is tight with respect to the friction surface 262. In this position, the holesaw 38 is fixed and ready for use.

Figure 6:
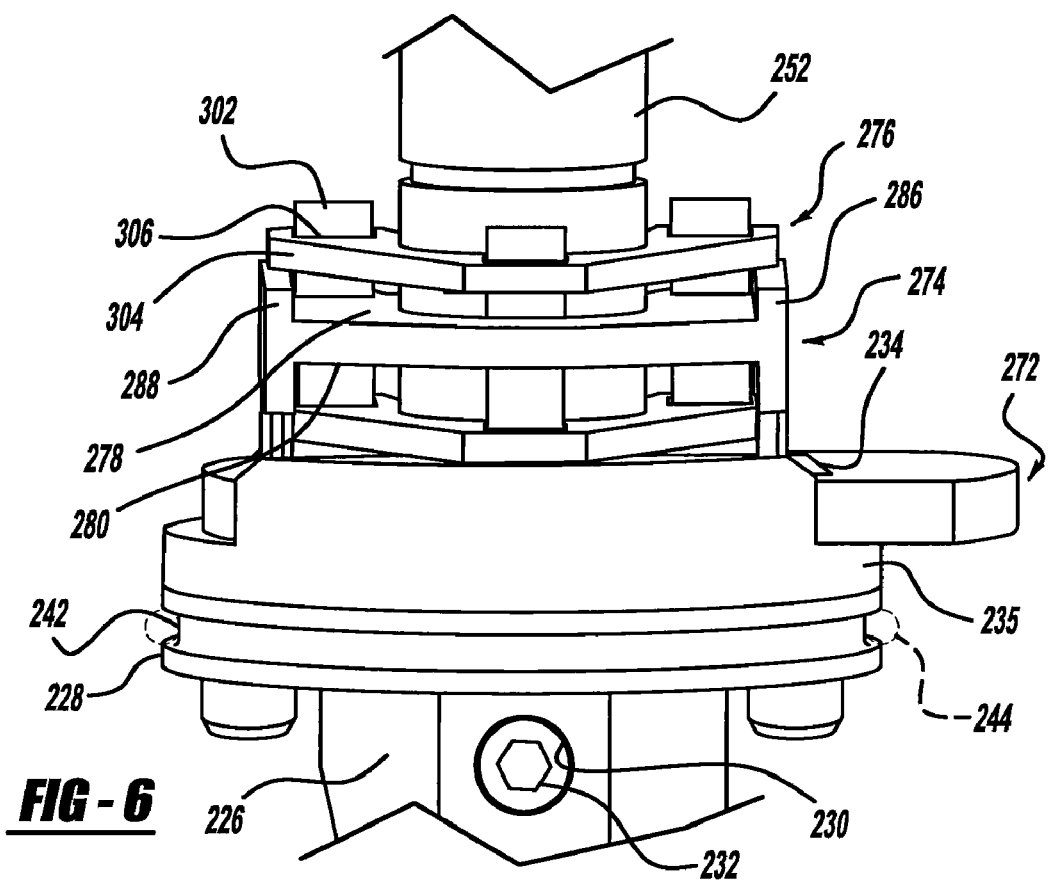
FIG. 6 is a side elevation view of the mandrel assembly, with the housing removed, in a first position.

The mechanism 218 to move the first member 216 includes a slider assembly 270, disk shaped body member 235 and a release assembly 272. The slider assembly 270 includes a plate 274 and a pair of roller assemblies 276. The plate 274 includes a pair of side planer faces 278 and 280. The side faces 278 and 280 are angled with respect to one another and is exaggerated in FIG. 9a. This angle or ramp creates an offset of forces when a force is applied vertically onto it. The offset angle is about 1°, however it could be more or less to effect movement of the plate 274 (see FIG. 9a). An aperture 282 is cut into the plate 274. The aperture 282 is elongated, having an oval shape, to enable the plate 274 to move with respect to the second extending member 224 which it is positioned on as illustrated in FIGS. 6 and 7. The plate 274 includes a pair of rails 286 and 288 that abut bosses 258 in the housing 214 to provide smooth transitional movement of the slider assembly 270 in the housing 214. The plate 274 includes a tail 290 that is positioned within a biasing member 292 to move the slider assembly 270 between its first and second position. Additionally, the rails 286, 288 include cutouts 294 that are associated with the release mechanism 272 to lock and unlock the slider assembly 270 in position.

The roller assemblies 276 are identical. Accordingly, the description applies to both. The roller assemblies 276 include a plurality of rollers 302. The rollers 302, as illustrated three on each assembly, are secured in cages 304. The cages 304 are triangular plate shaped and include apertures 306 to receive the rollers 302. Additionally, the cages 304 have an aperture 308 to enable the extending member 224 to be positioned through the cages 304. The apertures 308 are elongated, having an oval shape, to enable the cages 304 to move laterally with respect to the axis of the mandrel 210.

Figure 10:
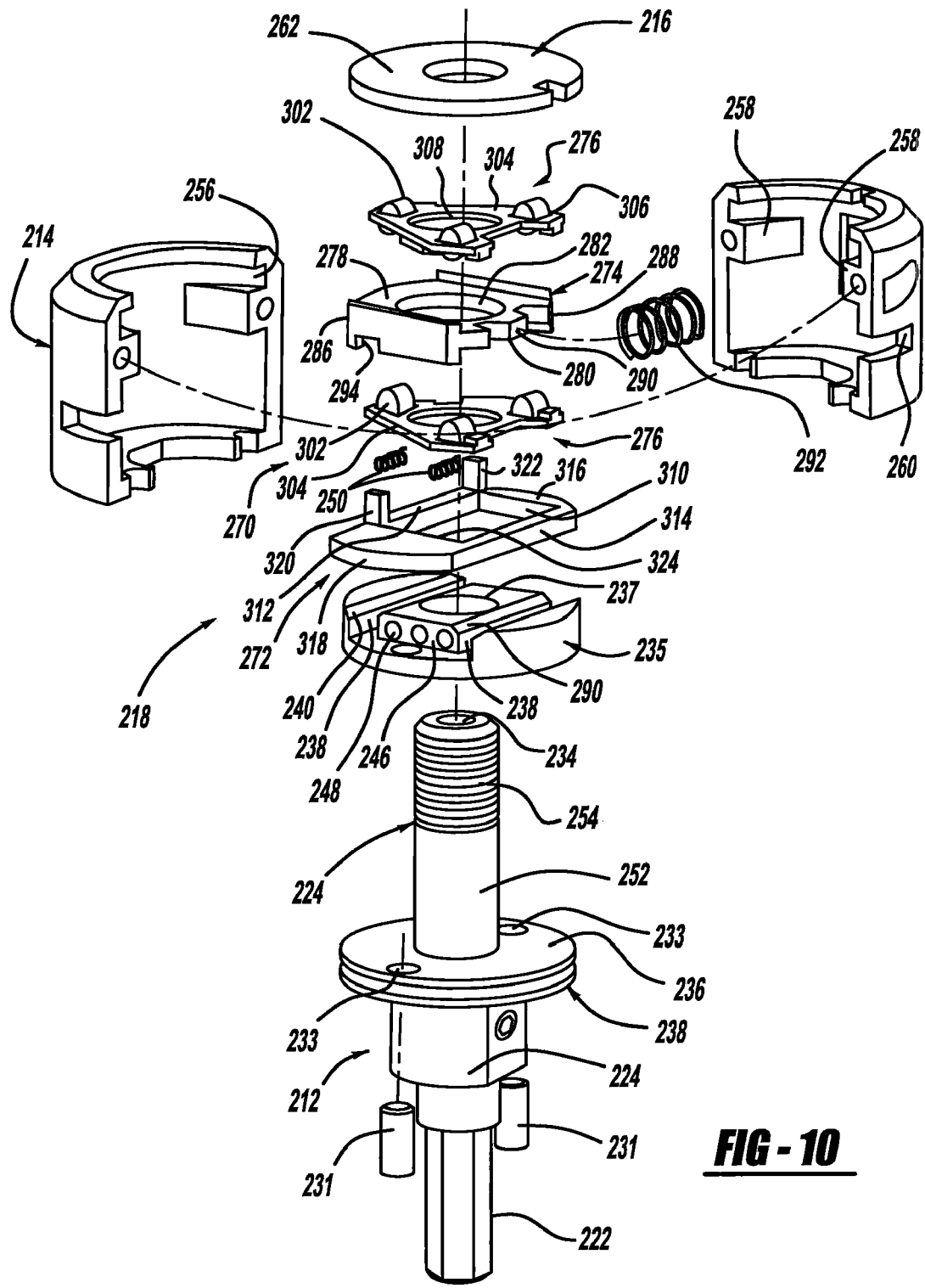
FIG. 10 is an exploded perspective view of the mandrel assembly of FIG. 5.

The disk shaped body member 235 includes a pair of grooves 238. The grooves 238 include a ramp surface 240 adjacent the grooves 238. A circular aperture 237 enables the body member 235 to be positioned on the second extending member 224. The body member 235 is positioned on the flat receiving surface 236 of the second cylindrical plate 228. Additionally, the body member 235 includes a flat portion 246 on its circumference positioned between the grooves 238, as seen in FIG. 10. The flat portion 246 preferably includes at least one bore 248, preferably a plurality of bores. The bores 248 include springs 250 utilized to bias the release assembly 272.

The release mechanism 272 has an overall rectangular shape with rounded ends on its smaller side edges of the rectangle. An aperture 310 is formed in the release mechanism 272. The aperture 310 has a rectangular configuration. The aperture 310 forms a pair of elongated rail members 312, 314 on each long side of the aperture 310. Additionally, D-shape configurations 316 and 318 are formed on the opposite short sides of the rectangle. At least one, preferably a pair of projecting members 320, 322 extends from the release member 272. The projecting members 320, 322 mesh with the cutouts 294 to lock and unlock the slider assembly 270 in position. The elongated portions 312 and 314 are sized such that they fit into the groove 238 of the body member 235 to enable sliding movement of the release member 272 with respect to the body member 235. One edge 324 of the D-shaped member 318 contacts the spring 250 in the bore 248 of the body member 235 to provide biasing of the release member 272 moving it between a first and second position.

In use, the holesaw 38 is screwed onto the spud 254 and tightened until it contacts with the first member 216. After this, the mandrel assembly 210 is ready for use to drill holes into the desired workpiece. After use, the mandrel assembly 210 is operated as follows to enable the holesaw 38 to be readily removed from the mandrel assembly 210.

Figure 9:
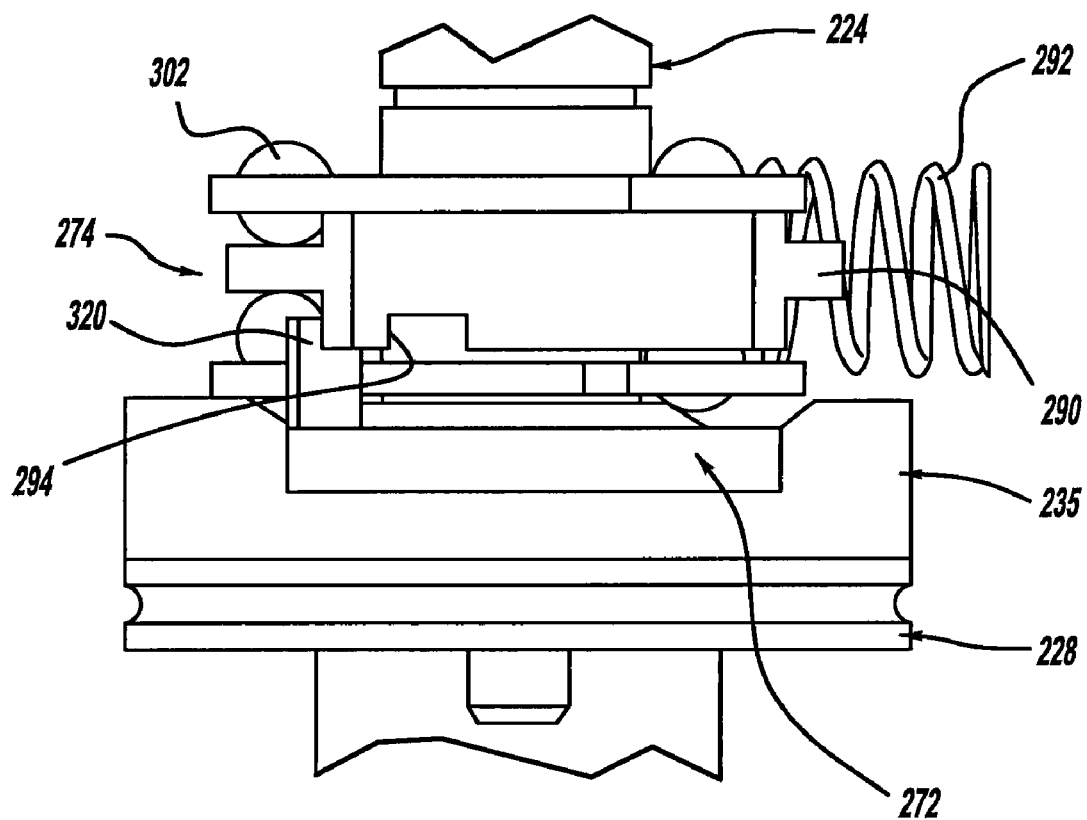
FIG. 9 is a view like FIG. 8 in a second position.
Figure 9A:
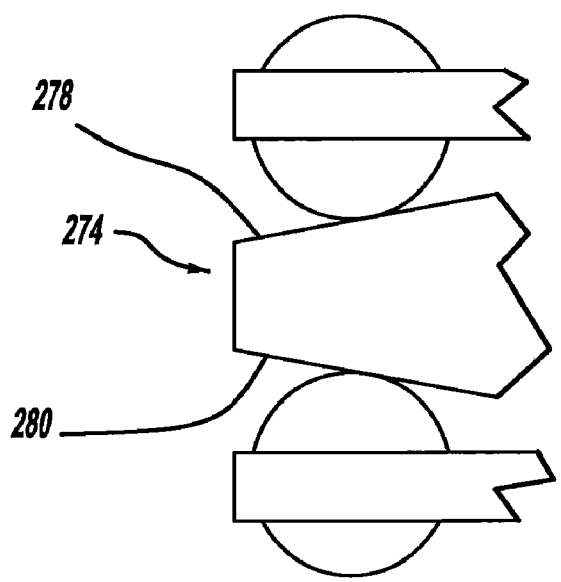
FIG. 9a is an enlarged view of a portion of the slider plate.

In order to remove the holesaw 38, the release mechanism 272 is pushed inward into the housing 214. As this occurs, the projecting members 320, 322 connect to the release mechanism 272 and move out of engagement with the cutouts 294, as illustrated in FIGS. 8 and 9. As the projections 320, 322 move out of the cutouts 294, the slider assembly 270 moves laterally with respect to the axis of the mandrel assembly 210, as seen in FIGS. 6 and 7. This happens due to the angled surfaces 278, 280 of the plate 274. The vertical force asserted by the holesaw 38 squeezes the wedge plate 274 between the rollers 302 pushing the slider assembly 270 laterally against the spring 292 as seen in FIG. 9a. The slider assembly 270, due to the rollers 302, begins moving laterally against the spring 292. As this occurs, the plate 274, as well as the roller assemblies 276, move laterally with respect to the axis of the extending member 224. As this occurs, the rollers 302 roll the rollers assemblies 276 and plate 274 against the force of spring 292. The rollers 302 roll along the side faces 278, 280 of the plate 274 as well as along the bottom surface of the first member 216 and the face of the body member 235. The rollers 302 contact the ramps 240 which, in turn, enable the rollers 302 to drop into the grooves 238 on top of the elongated portions 312, 314. As this occurs, the friction surface 270 is moved downward away from the holesaw 38 to provide a gap between the friction surface 270 and the holesaw 38 to enable the holesaw 38 to be removed, without any force on it, from the mandrel assembly 210. After the holesaw 38 is removed, the spring 292 forces the slider assemblies 276 in an opposite direction. After this occurs, the cutouts 294 align with the projection members 320, 322. As this occurs, the spring 250 in the bores 248 of the mandrel body 220 pushes the release member 272 outwardly so that the projection members 320, 322 again mesh with the cutouts 294 in the rails 286, 288 of the plate 274. Accordingly, the mandrel assembly 210 is returned to its original position ready for addition of a holesaw 38.

The description of the invention is merely exemplary in nature and, thus, variations that do not depart from the gist of the invention are intended to be within the scope of the invention. Such variations are not to be regarded as a departure from the spirit and scope of the disclosure.

What is claimed is:

1. A mandrel assembly comprising:
a mandrel having a body and a first and second end, said first end for coupling with a drill motor, said second end extending from said body and including a mechanism for receiving a holesaw;
a housing covering a portion of the mandrel, said housing coupled with said mandrel, a first member coupled with said housing, said first member movable along said second end of said mandrel;
a friction surface on said first member, said friction surface adapted for contacting a surface of the holesaw such that upon contact with said friction surface, the holesaw is in a fixed position with respect to said mandrel assembly, said friction surface moving between a first position and a second position; and
a mechanism associated with said housing for moving said friction surface between said first and second positions, said mechanism having a portion extending outside of the housing.

2. The mandrel assembly according to claim 1, said mechanism associated with said housing further comprising a slider assembly associated with said first member and a release member coupled with said slider assembly, said release member moving between a first and second position for locking and unlocking said slider assembly in said housing.

3. The mandrel assembly according to claim 2, further comprising a biasing member biasing said slider assembly between said locked and unlocked positions.

4. The mandrel assembly according to claim 2, said slider assembly further comprising a plate having first and second sides, an aperture in said plate for receiving said second end of said mandrel, said aperture sized to enable movement of the plate laterally with respect to an axis of the mandrel, a pair of roller assemblies arranged on said plate first and second sides, respectively, one of said roller assemblies sandwiched between said first member and said plate and the other roller assembly sandwiched between said plate and said mandrel body.

5. The mandrel assembly according to claim 4, further comprising a body member with a pair of grooves for receiving rollers of said roller assembly such that as said rollers fall into said grooves, said friction surface moves between said first and second positions.

6. The mandrel assembly according to claim 4, further comprising a pair of rails at two opposing edges of said plate, at least one rail including a cutout portion.

7. The mandrel assembly according to claim 6, further comprising a projection on said release member, said projection moving in and out of said cutout for locking and unlocking said slider assembly.

8. The mandrel assembly of claim 7, further comprising at least one bore in said body member, at least one spring in said bore, said spring biasing said release member between its first and second positions.

9. The mandrel assembly of claim 6, further comprising bosses on said housing for contacting said rails for enabling smooth transitional movement of said slide assembly in said housing.

10. The mandrel assembly of claim 4, wherein said roller assemblies including a plurality of rollers secured by a cage, at least one roller positioned on different sides of a plane through the axis of said mandrel assembly.

11. The mandrel assembly of claim 4, wherein said sides of said plate are angled with respect to one another.

* * * * *